US009563693B2

(12) United States Patent
Zhang et al.

(10) Patent No.: US 9,563,693 B2
(45) Date of Patent: Feb. 7, 2017

(54) DETERMINING SENTIMENTS OF SOCIAL POSTS BASED ON USER FEEDBACK

(71) Applicant: ADOBE SYSTEMS INCORPORATED, San Jose, CA (US)

(72) Inventors: Lei Zhang, San Jose, CA (US); Zhigang Qi, Sunnyvale, CA (US); Masayuki Hokari, San Jose, CA (US); Harish Suvarna, San Jose, CA (US); Diptiben B. Thakkar, Milpitas, CA (US); Evelyn Chan, Las Vegas, NV (US)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 263 days.

(21) Appl. No.: 14/468,054

(22) Filed: Aug. 25, 2014

(65) Prior Publication Data

US 2016/0055235 A1 Feb. 25, 2016

(51) Int. Cl.
*G06F 17/30* (2006.01)
*G06F 17/27* (2006.01)
(Continued)

(52) U.S. Cl.
CPC ..... *G06F 17/30684* (2013.01); *G06F 17/2735* (2013.01); *G06F 17/2785* (2013.01); *G06Q 50/01* (2013.01); *H04L 65/403* (2013.01)

(58) Field of Classification Search
CPC ............ G06F 17/30684; G06F 17/2735; G06F 17/274; G06F 17/3043; G06F 17/2785; G06F 17/30; G06F 17/2223; G06F 17/277; G06F 17/271; G06F 17/30958; G06F 17/30368; G06Q 50/01; G06Q 30/0201; G06Q 30/0242; H04L 65/403; H04L 29/06; H04L 63/08; H04L 41/0631; G06N 5/02; G06N 5/022; G06N 99/005; G06N 5/04; G04L 67/10

See application file for complete search history.

(56) References Cited

U.S. PATENT DOCUMENTS

| 2010/0223341 | A1* | 9/2010 | Manolescu | ....... G06F 17/30905 709/206 |
|---|---|---|---|---|
| 2011/0238670 | A1* | 9/2011 | Mercuri | ............ G06Q 30/0282 707/748 |

(Continued)

OTHER PUBLICATIONS

Hany M. SalahEldeen and Michael L. Nelson—"Reading the Correct History? Modeling Temporal Intention in Resource Sharing"—Proceeding JCDL '13 Proceedings of the 13th ACM/IEEE-CS joint conference on Digital libraries—Jul. 22-26, 2013,—pp. 257-266.*

(Continued)

*Primary Examiner* — Anh Ly
(74) *Attorney, Agent, or Firm* — Shook Hardy & Bacon L.L.P. Intellectual Property Department

(57) ABSTRACT

User feedback regarding sentiments of social posts is used to improve sentiment assignment for social analysis. The user feedback is used to generate sentiment tuning data, which may include assignments between reference sentiments and reference social posts. Sentiments of new social posts may be determined by applying the sentiment tuning data to an analysis of the new social posts. Sentiments of new social posts may also be determined by applying entries from one or more lexical dictionaries to the new social posts using natural language processing. At least some of the entries can be automatically generated from the user feedback or can be supplied by a user separate from the user feedback.

20 Claims, 7 Drawing Sheets

(51) Int. Cl.
    *H04L 29/06*      (2006.01)
    *G06Q 50/00*      (2012.01)

(56) References Cited

U.S. PATENT DOCUMENTS

| | | | | |
|---|---|---|---|---|
| 2012/0095863 A1* | 4/2012 | Schiff | ................ | G06Q 30/0631 |
| | | | | 705/26.7 |
| 2012/0173508 A1* | 7/2012 | Zhou | ................ | G06F 17/30864 |
| | | | | 707/709 |
| 2012/0323634 A1* | 12/2012 | Harper | ................ | G06Q 30/02 |
| | | | | 705/7.31 |
| 2013/0124653 A1* | 5/2013 | Vick | ................ | H04L 51/32 |
| | | | | 709/206 |
| 2014/0040010 A1* | 2/2014 | Garcia-Martinez | .... | G06Q 30/02 |
| | | | | 705/14.43 |
| 2014/0278786 A1* | 9/2014 | Liu-Qiu-Yan | ...... | G06Q 30/0201 |
| | | | | 705/7.32 |
| 2015/0052129 A1* | 2/2015 | Galvin, Jr. | ......... | G06Q 30/0201 |
| | | | | 707/731 |
| 2015/0052238 A1* | 2/2015 | Ganesh | ............ | G06F 17/2785 |
| | | | | 709/224 |
| 2016/0071119 A1* | 3/2016 | Blanchflower | ..... | G06F 17/2785 |
| | | | | 705/7.29 |

OTHER PUBLICATIONS

Il-Chul Moon et al.—"Temporal Issue Trend Identifications in Blogs"—Published in: Computational Science and Engineering, 2009. CSE '09. International Conference on—Aug. 29-31, 2009—pp. 1-7.*
Glorot et al., "Domain Adaptation for Large-Scale Sentiment Classification: A Deep Learning Approach" in Proceedings of the 28th International Conference on Machine Learning; Bellevue, Washington; 2011; 8 pages.
Lin et al., "Large-Scale Machine Learning at Twitter" SIGMOD, May 20-24, 2012; Scottsdale, Arizona; pp. 793-804.
Pan et al., "Cross-Domain Sentiment Classification via Spectral Feature Alignment," International World Wide Web Conference 2010; Apr. 26-30, 2010; Raleigh, North Carolina, 10 pages.
Brew et al., "Using Crowdsourcing and Active Learning to Track Sentiment in Online Media," http://sentiment.ucd.ie, 6 pages.

* cited by examiner

US 9,563,693 B2

DETERMINING SENTIMENTS OF SOCIAL POSTS BASED ON USER FEEDBACK

BACKGROUND

Social networking has become an increasingly popular presence on the Internet. Social network services allow users to easily connect with friends, family members, and other users in order to share, among other things, comments regarding activities, interests, and other thoughts. As social networking has continued to grow, companies have recognized value in the technology. For instance, companies have found that social networking provides a great tool for managing their brand and driving consumers to their own web sites or to otherwise purchase their products or services. Companies can create their own social networking profiles for communicating with consumers via social networking posts.

To assist companies in their social networking efforts, some social analysis tools, such as the ADOBE SOCIAL tool, have been developed that provide mechanisms for companies to collect information regarding what consumers are saying and manage responses to consumers' social networking posts. Due to the often large amounts of social networking posts, it may be desirable for social analysis tools to determine sentiments of the posts to reduce the amount of manual processing performed by the companies. The sentiments may include, for instance, positive, negative, or neutral sentiments being expressed by of the users who submitted or posted the social networking posts. For example, a company may wish to address social networking posts that have negative sentiment or positive sentiment in order to strategically respond to those posts. Accurately determining the sentiments may be challenging in light of domain-specific expressions, colloquial expressions, neologisms, and other obscure content that may be found in social networking posts.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Aspects of the present disclosure relate to determining sentiments of social posts based on user feedback. Social posts and any corresponding sentiments assigned by the system may be presented to a user for review and feedback. During the review, the user may generate user feedback that includes any combination of confirming assigned sentiments for social posts, changing assigned sentiments for social posts, refuting assigned sentiments for social posts, contradicting assigned sentiments for social posts, and changing assigned degrees of the sentiments for social posts.

The user feedback can be used to generate sentiment tuning data to improve future analysis of social posts in order to more effectively assign sentiments to those new social posts. Any portion of the sentiment tuning data may be applied to the future analysis of social posts for the user and/or other users. For example, at least a portion of sentiment tuning data may be user specific or may be used with respect to multiple users. Additionally, at least some of the user provided data may not be from the aforementioned user feedback, but can still be provided by the user to improve the analysis. An example of such data includes a user supplied lexical dictionary, which can be utilized in performing natural language processing on social posts.

BRIEF DESCRIPTION OF THE DRAWINGS

The present invention is described in detail below with reference to the attached drawing figures, wherein.

DETAILED DESCRIPTION

Figure 1:
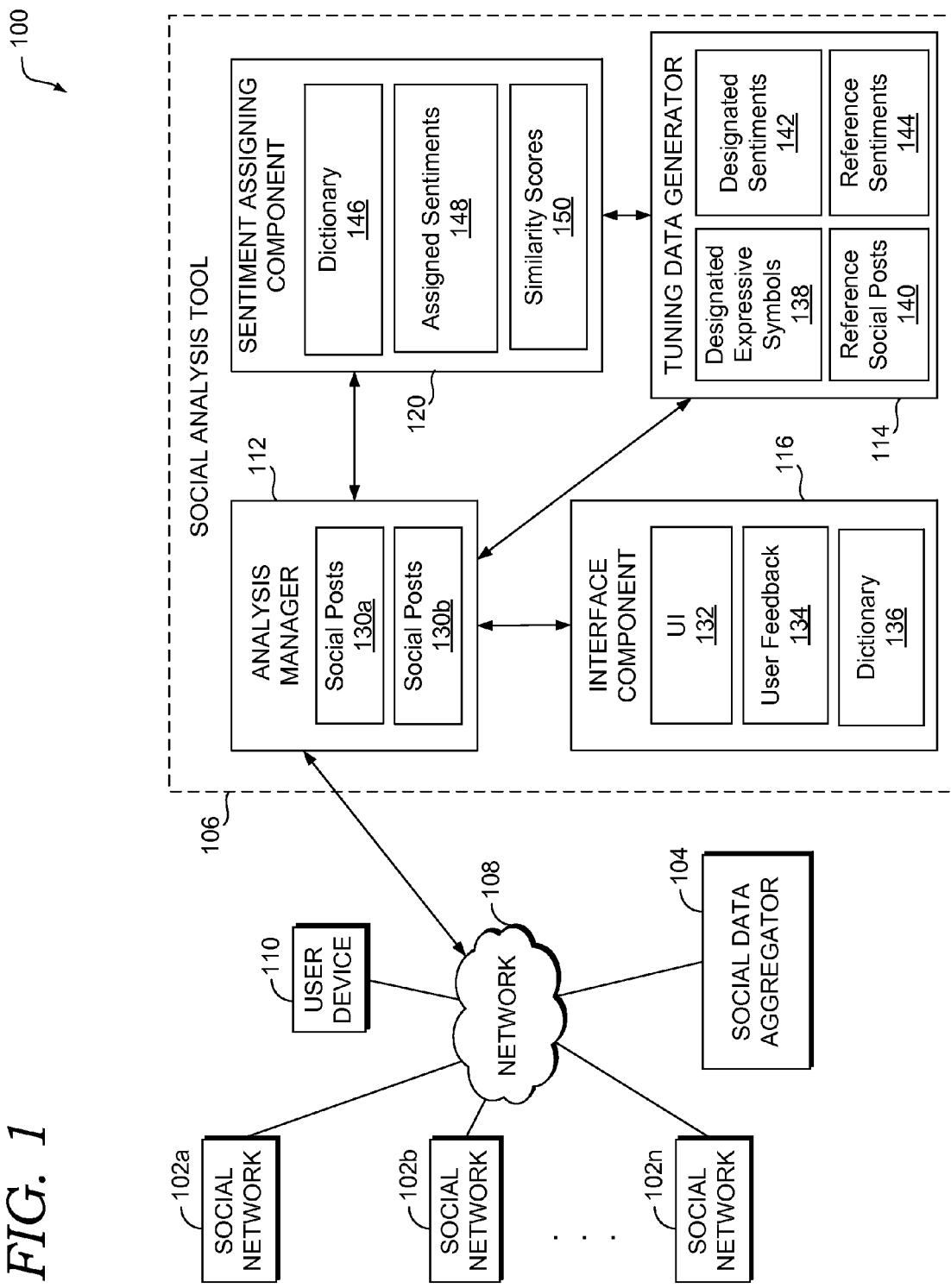
FIG. 1 is a block diagram showing a system for determining sentiments of social posts in accordance with implementations of the present disclosure.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Various terms are used throughout this description. Definitions of some terms are included below to provide a clearer understanding of the ideas disclosed herein:

The terms "social networking service" and "social networking site" refer to any online presence at which a user may share comments with other users within a social network. For instance, this may include services, such as the TWITTER, FACEBOOK, LINKEDIN, TUMBLR, and YOUTUBE services, to name a few.

A "social analysis tool" refers to software that facilitates companies' analysis of social networks. Among other things, a social analysis tool may be used by a company to collect information from social networking services and to manage social content and messages using social network services.

A "capture rule" refers to criteria, such as text, phrases, and/or metadata, used to capture social data from social networking services that is provided to and/or displayed within a moderation tool as social mentions.

A "social post" includes any communication provided by a social user to, and available to other social users on, a social networking service or site. A social post may include both the content of a social networking message (e.g., text, images, videos, links, etc.) and metadata associated with the message.

A "social user" refers to any user of social networking services or sites for posting and/or viewing social posts. This is distinguished from users of social analysis tools.

A "poster" refers to a social user who submits a social post to a social networking service or site.

"Poster sentiment" (or simply "sentiment") can correspond to an attitude of the poster portrayed in the post, such as a negative, positive, or neutral attitude, which may be directed toward a subject in the social post, such as a company or product.

"User feedback" refers to user-generated content that is created from user input in response to informational content provided to a user.

"Sentiment tuning data" refers to data that supplements assigning of sentiments to social posts and can be determinative of a sentiment assigned to at least one of the social posts by the assigning.

"Sentiment indicators" refer to data that can indicate associations between social posts and sentiments.

"Expressive symbols" refer to one or more characters, words, phrases, emoticons, hashtags, and/or special spellings of words that are indicative of one or more sentiments.

To assist companies in their social networking efforts, some social analysis tools, such as the ADOBE SOCIAL tool, have been developed that provide mechanisms for companies to collect information regarding what consumers are saying and manage responses to consumers' social networking posts. Due to the often large amounts of social networking posts, it may be desirable for social analysis tools to determine sentiments of the posts to reduce the amount of manual processing performed by the companies.

Accurately determining sentiments for social posts may be challenging in light of domain-specific expressions, colloquial expressions, neologisms, and other obscure content that may be found in social networking posts. For example, in assigning sentiments to social posts, a social analysis tool may generally associate the word "go" with a neutral sentiment. Therefore, the text "I plan to go to the store" in a social post would typically be classified as having a neutral sentiment. However, the word "go" can be associated with a positive sentiment in a sports domain. Thus, the text "Go 49ers!" in a social post may be classified as having a neutral sentiment, when a user would expect a positive sentiment.

In accordance with the present disclosure, sentiments can be assigned to social posts to form associations between the social posts and the sentiments. Such assignments may optionally be presented to a user, such as a user of a social analysis tool, for review and feedback. The review can generate user feedback, which can be used to improve future analysis, determination, and/or assignment of sentiments to new social posts. By incorporating user feedback, sentiments can be more accurately assigned to social posts.

The accuracy may improve over time as additional user feedback is provided, which allows for adaptation to changing lexical meanings of words, expressions, phrases, and the like, over time. Additionally, user feedback can optionally be applied to sentiment assignment on a user specific basis, whereby the assignment of sentiments may adapt to different needs or expectations that can vary between users. In addition to or instead of user feedback, a user can provide a user supplied lexical dictionary, which can be employed by natural language processing to improve the assignment of sentiments for the user. Utilizing any of various approaches described herein, determining the sentiments may be improved for domain-specific expressions, colloquial expressions, neologisms, and other obscure content that may be found in social networking posts.

Turning now to FIG. 1, a diagram is provided illustrating an exemplary system 100 in which some implementations of the present disclosure may be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Among other components not shown, system 100 includes a number of social networking services, such as social networking services 102a and 102b through 102n, social data aggregator 104, social analysis tool 106, and user device 110. It should be understood that system 100 shown in FIG. 1 is an example of one suitable computing system architecture. Each of the components shown in FIG. 1 may be implemented via any type of computing device, such as computing device 700, later described with reference to FIG. 7, for example. The components may communicate with each other via network 108, which may include, without limitation, one or more local area networks (LANs) and/or wide area networks (WANs). Such networking environments are commonplace in offices, enterprise-wide computer networks, intranets, and the Internet.

It should be understood that any number of social networking services, social data aggregators, social analysis tools, and user devices may be employed within system 100 within the scope of the present disclosure. Each may comprise a single device or multiple devices cooperating in a distributed environment. For instance, social analysis tool 106 may be provided via multiple devices arranged in a distributed environment that collectively provide the functionality described herein. Additionally, other components not shown may also be included within the distributed environment.

Amongst various possible uses, social analysis tool 106 may be employed by a company to assist in managing the company's brand. Social analysis tool 106 can collect social data from social networking services 102a and 102b through 102n. As represented in FIG. 1, social data may be collected from any number of social networking services. Amongst the social data are social posts, such as social posts 130a and 130b. In some instances, social analysis tool 106 accesses social data directly from a social networking service or an entity, such as the entity providing social analysis tool 106. Also, in some instances, at least some of the social data is accessed from one or more social networking services and the social data is provided to social analysis tool 106. A social networking service may provide application programming interfaces (APIs) that expose the social data for access. In addition, or instead, social analysis tool 106 may access the social data from social data aggregator 104, which may be a third-party service (e.g., the Gnip service). Social data aggregator 104 may operate to access social data from one or more social networking services, standardize the social data, and provide the standardized data to social analysis tool 106. Any and all such variations are contemplated to be within the scope of the present disclosure.

As shown in FIG. 1, social analysis tool 106 includes, among other constituents not shown, analysis manager 112, interface component 116, tuning data generator 114, and sentiment assigning component 120.

Analysis manager 112 is configured to manage analysis of social data for social analysis tool 106, including social posts. In this capacity, analysis manager 112 can provide social posts, such as social posts 130a and 130b, for analysis by social analysis tool 106. This may be accomplished utilizing one or more capture rules that set forth criteria for identifying certain social content, such as the social posts, for capture from the social data. Generally, any aspect of social data that may be of interest to a company, or other user of social analysis tool 106, may be included as criteria in capture rules. The criteria may specify terms or phrases to be included within social posts. For example, the terms may include a company's trademarks or terms relevant to a company's products, services, industry, or otherwise of interest to a company or user. The terms may be bare terms or may be terms associated with a hashtag or other term tagging mechanism employed by social users. Any number of terms or phases may be included within the capture rules, which may change over time.

The capture rules may also set forth metadata criteria. In particular, a variety of metadata may be associated with the social data, for example with each social post. This may include, for instance, information regarding: the author of a social post (e.g., demographic information, name or other identification, location, language the author claims to speak, number of messages previously captured by the capture rules for the author, Klout score, number of followers, etc.), number of comments, retweets, or other social posts from other social users on the social post; a social networking service on which the social post was posted; and a day/time when the social post was posted. The capture rules may include criteria specifying different combinations of metadata.

Analysis manager 112 provides the social posts, such as social posts 130a to sentiment assigning component 120 for assigning sentiments to the social posts, resulting in assigned sentiments, such as assigned sentiments 148. A sentiment can be assigned to each social post. In this respect, sentiment assigning component 120 can analyze the text of social posts 130a, submitted by social users, to determine sentiments of the social posts. Any of a variety of analysis techniques may be employed to assign the sentiments to the social posts.

In various implementations, the text of the social posts may be analyzed using natural language processing to assess the sentiments of the social posts. The natural language processing may employ at least one lexical dictionary, such as lexical dictionary 146. Lexical dictionary 146 comprises associations between designated expressive symbols and designated sentiments as entries therein. The designated expressive symbols can correspond to characters, words, phrases, emoticons, hashtags, and/or special spellings of words that are indicative of one or more sentiments that are typically indicative of associated designated sentiments, when present in a social post. Expressive words generally comprise text, but could comprise images, video, or other content. For example, "excited" typically indicates positive sentiment. It is noted that the same expressive symbol can optionally have multiple entries in lexical dictionary 146, which can be selected from based on surrounding parts of speech and content in a social post.

Sentiment assigning component 120 can identify expressive symbols of lexical dictionary 146 in the text of a social post, and based on any associated designated sentiments in lexical dictionary 146, assign a sentiment to the social post. Assignments may consider multiple expressive symbols and multiple associated designated sentiments, as well as any other text in the social post, which may be structured in a parse tree, and metadata, to arrive at one or more sentiments. Herein, indicated associations between social posts and sentiments are generally referred to as sentiment indicators. Entries in lexical dictionary 146 correspond to some sentiment indicators, which can be used to assign sentiments to social posts. Other types of sentiment indicators are described below, such as sentiment indicators that are generated from user feedback.

Sentiment assigning component 120 can optionally determine degrees of sentiments, which can take the form of sentiment scores, and correspond to the sentiments of the social posts. If the sentiment score for a social post is below a first threshold, a first sentiment has been assigned; if the sentiment score for a social post is above a second threshold, a second sentiment has been assigned, and if the sentiment score is between the first and second thresholds, a third sentiment has been assigned. For example, the first, second, and third thresholds can define first, second, and third ranges for the sentiments. As an example, the first, second, and third ranges can correspond to negative, positive, and neutral sentiments, respectively. In various implementations, any number of thresholds and assigned sentiments can be employed.

In some implementations, a single threshold may be employed, and either a first or a second sentiment has been assigned depending on whether the sentiment score is above or below the single threshold. For example, the first sentiment can correspond to negative poster sentiment and the second sentiment can correspond to positive sentiment. Thus, only positive or negative sentiment may be assigned in some cases. However, it will be appreciated that the classification may be more granular.

Sentiment assigning component 120 can provide the assigned sentiments, such as assigned sentiments 148, which are mapped to or are otherwise associated with the social posts, to analysis manager 112. The assigned sentiments may be utilized in various manners, which can be fully automated, or can include any amount of user input from a company or other user of social analysis tool 106. This can include providing responses to social users who posted the social posts based on the assigned sentiments, and/or generating reports on the assigned sentiments for the company or other user of social analysis tool 106 to review. Uses of social analysis tool 106 that incorporate user input may employ interface component 116.

Interface component 116 is configured to facilitate interactions between social analysis tool 106, and users thereof. A user can correspond to a user account, which may optionally comprise any number of sub accounts. The user account may be maintained by analysis manager 112 amongst a plurality of user accounts. The users may interact with social analysis tool 106 on any number of user devices, such as user device 110. This can be accomplished utilizing user interface (UI) 132, which can be displayed on a screen of a user device. The user device might take on a variety of forms, such as a personal computer (PC), a laptop computer, a mobile phone, a tablet computer, a wearable computer, a personal digital assistant (PDA), a server, an MP3 player, a global positioning system (GPS) device, a video player, a handheld communications device, a workstation, any combination of these delineated devices, or any other suitable device. In some implementations, a portion of user interface 132 is presented on the user device in a web browser or other application configured to communicate with social analysis tool 106.

Analysis manager 112 can employ interface component 116 to receive user feedback on associations between social posts and sentiments (e.g., social posts 130*a/b* and assigned sentiments 148). As will later be described in further detail, the user feedback can be utilized to generate sentiment tuning data, which can be applied to new social posts by sentiment assigning component 120, to improve the determination of sentiments for the new social posts.

Interface component 116 can present social posts to receive user feedback for each social post regarding an association between the social post and one or more sentiments. For example, the social posts can correspond to social posts 130*a*, and the associations can correspond to assigned sentiments 148, determined by sentiment assigning component 120. The presenting may be accomplished via UI 132 on a display of a user device, such as user device 110. The presenting can optionally indicate the associations between the social posts and the sentiments to a user, or the associations may be hidden from the user.

Any to all of the text of a social post may be presented. Furthermore, associations can be indicated by displaying sentiment scores, assigned sentiments, a color scale, tables, charts, or other means. As an example, a social post having the text "go 49ers!" may be presented with an indication of an assigned sentiment of a neutral sentiment. Sentiment assigning component 120 may have assigned the neutral sentiment because the expressive symbol "go" in lexical dictionary 146 is generally associated with neutral sentiment and 49ers is a proper noun that is a subject of the expressive symbol. Based on the assignment, UI 132 may display "go 49ers!" adjacent the word "neutral" and/or a sentiment score of "5," which indicates a neutral sentiment on a scale where 1 represents a highest degree of negative sentiment and 10 represents a highest degree of positive sentiment. Displaying at least a portion of a social post adjacent to a sentiment is but one way to indicate the assignment to the user.

A user may provide user input to generate the user feedback in response to the presenting of a social post. In various implementations, the user feedback includes any combination of confirming assigned sentiments for social posts, changing assigned sentiments for social posts, refuting assigned sentiments for social posts, contradicting assigned sentiments for social posts, or changing degrees of the assigned sentiments for social posts. In some implementations, the user feedback comprises a user selection of a sentiment and/or a degree of a sentiment. For example, the user may be presented with one or more selectable options of possible sentiments and/or degrees of sentiments. Many approaches are available for presenting and/or receiving user feedback on social posts and associated sentiments, and are compatible with the present disclosure.

The user feedback can indicate an association between a presented social post and a different sentiment than an assigned sentiment for at least one of the aggregated social posts. Thus, the user feedback can contradict the assigned sentiment. For example, where the social post included the text "go 49ers!," the assigned sentiment may have been a neutral sentiment, but the user feedback indicates that the user selected a positive sentiment. By generating sentiment tuning data from the user feedback, the next time sentiment assigning component 120 is tasked with assigning a sentiment to a new social post comprising "go 49ers!," or a sufficiently similar new social post, such as "go Raiders!," a positive sentiment can be assigned to the new social post by applying the sentiment tuning data to the new social post. Therefore, the assigned sentiments can be adapted to conform to user expectations.

Figure 2:
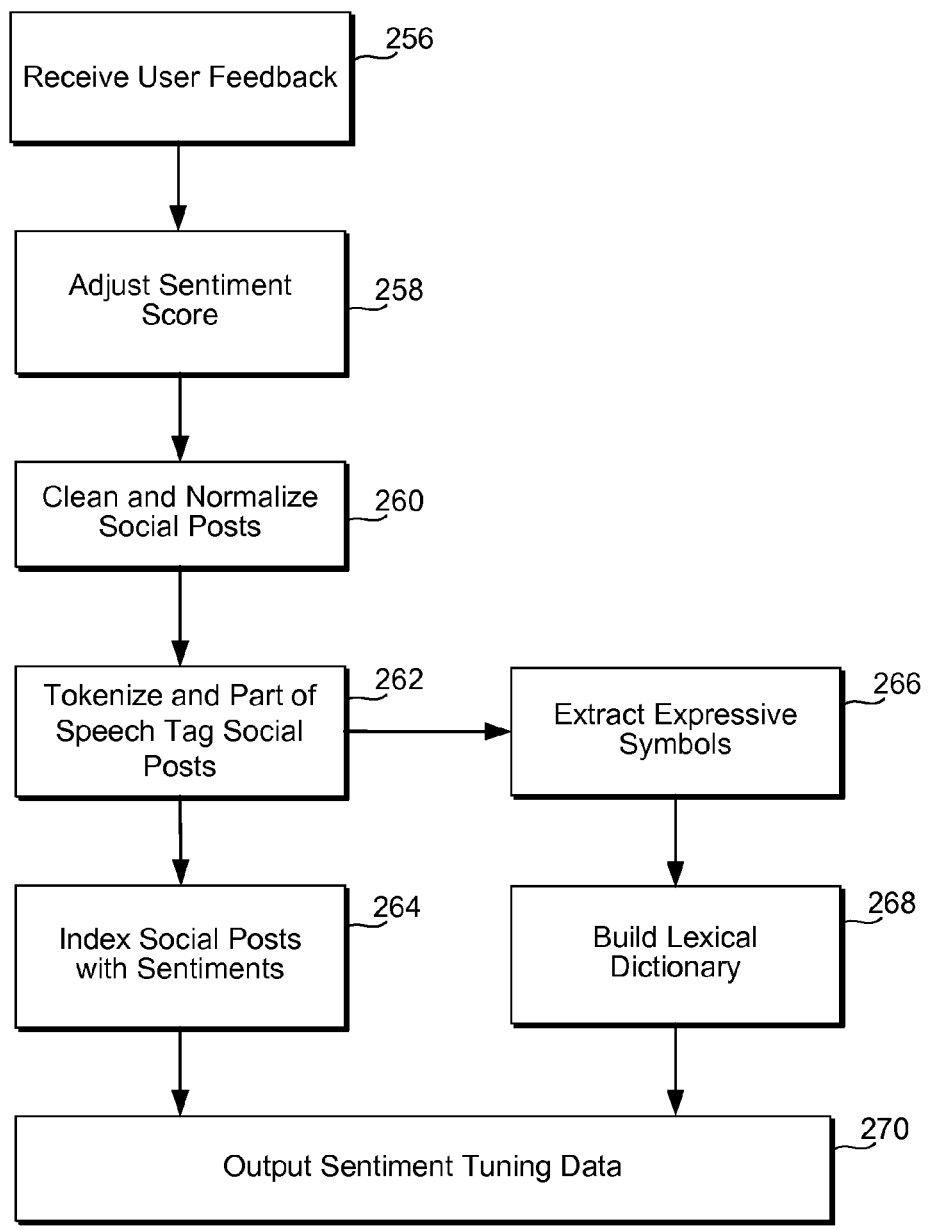
FIG. 2 is a flow diagram showing a method for generating sentiment tuning data in accordance with implementations of the present disclosure.

An exemplary approach to generating sentiment tuning data is shown in FIG. 2. Referring to FIG. 2 with FIG. 1, FIG. 2 is a flow diagram showing method 200 for generating sentiment tuning data in accordance with implementations of the present disclosure. Each block of method 200 and other methods described herein comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. For example, the methods may be provided as part of a social analysis tool, such as the ADOBE SOCIAL tool.

Tuning data generator 114 receives user feedback 134 from interface component 116 to generate sentiment tuning data from the user feedback, at block 256. User feedback 134 can optionally undergo sentiment score adjustment at block 258. This may be performed in implementations where social analysis tool 106 internally assigns sentiment scores to social posts. An internally assigned sentiment score can be adjusted based on user feedback 134. As examples, the assigned sentiment score for a social post can be adjusted to, or closer to, a sentiment score and/or sentiment range selected by the user as corresponding to the social post, as reflected in user feedback 134. With respect to sentiment ranges or categories, as indicated above, first, second, and third ranges of sentiment scores can correspond to negative, positive, and neutral sentiments, respectively. In some implementations, user feedback 134 indicates that a user selected a sentiment range, which is less specific than a sentiment score. At block 258, the assigned sentiment score can be set to or otherwise adjusted based on a sentiment score within the selected sentiment range. The adjusted sentiment scores can correspond to reference sentiments 144 in FIG. 1.

As illustrated by block 260, in some implementations, the social posts undergo data cleaning and normalization, which can comprise spelling correction, verb and pronoun equivalence adjustment, and more. For example, for the social post "gooooooooo 49ers!" can be normalized to "go 49ers!" Furthermore, as illustrated by block 262, the cleaned and normalized social posts can be tokenized and undergo part of speech tagging for use by sentiment assigning component 120 in natural language processing. Reference social posts, such as reference social posts 140 can result and can be indexed at block 264 for efficient extraction by sentiment assigning component 120.

Reference social posts 140 correspond to at least some of the social posts presented to a user for user feedback by interface component 116. Reference sentiments 144 correspond to sentiments associated with reference social posts 140, as indicated by the user feedback. As should be apparent from the forgoing, although reference social posts 140 correspond to social posts presented to the user, reference social posts 140 need not be identical to those social posts. For example, the social posts and sentiments can be processed by tuning data generator 114, which may alter the social posts at block 260.

Where one or more lexical dictionaries employed, at block 266, designated expressive symbols 138 and designated sentiments 142 associated with designated expressive symbols 138 can be identified and extracted from the cleaned, normalized, tokenized, and tagged social posts at block 266. Natural language processing can be employed to identify designated expressive symbols in the social posts, as well as assign designated sentiments, such as designated sentiment scores to the designated expressive symbols. Assigned sentiment scores at block 266 can be the same or different than the adjusted sentiment scores from block 258. In the example above, the social post "go 49ers!" may be processed to extract a designated expressive symbol "go" associated with a positive sentiment as a designated sentiment. The designated expressive symbol and the designated sentiment can be incorporated as an entry into a user feedback based lexical dictionary or can be incorporated into another dictionary, such as lexical dictionary 146 at block 268. More entries can be added over time as additional user feedback is generated for social posts, and as user feedback is provided to tuning data generator 114.

The generated sentiment tuning data is output at block 270 and can comprise any combination of designated expressive symbols, reference social posts, designated sentiments, and reference sentiments. Designated expressive symbols, reference social posts, designated sentiments, and reference sentiments are examples of sentiment indicators, examples of which are shown as reference social posts 140, reference sentiments 144, designated expressive symbols 138, and designated sentiments 142 in FIG. 1. Tuning data generator 114 can provide sentiment tuning data comprising the sentiment indicators to sentiment assigning component 120 to improve the accuracy of assigning sentiments to social posts and/or to customize the assignments to a user, such as the user providing the user feedback.

Additionally, the sentiment tuning data can optionally comprise designated expressive symbols and associated designated sentiments provided by the user outside of the user feedback, which may take the form of user supplied lexical dictionary 136. User supplied lexical dictionary 136 comprises entries of designated expressive symbols and designated sentiments, which can be merged into the user feedback based lexical dictionary or lexical dictionary 146, or any of those dictionaries may be maintained as separate dictionaries.

By maintaining the user feedback based lexical dictionary and the user supplied lexical dictionary separate from lexical dictionary 146, users of social analysis tool 106 can customize the assigning of sentiments to their liking, which may include domain-specific expressive symbols. For example, a user could have an entry for a designated expressive symbol "unexpected" as a designated sentiment of a positive sentiment, where the user operates in a movie domain. However, another user could have an entry for a designated expressive symbol "unexpected" as a designated sentiment of a negative sentiment, where the user operates in a finance domain.

Figure 3:
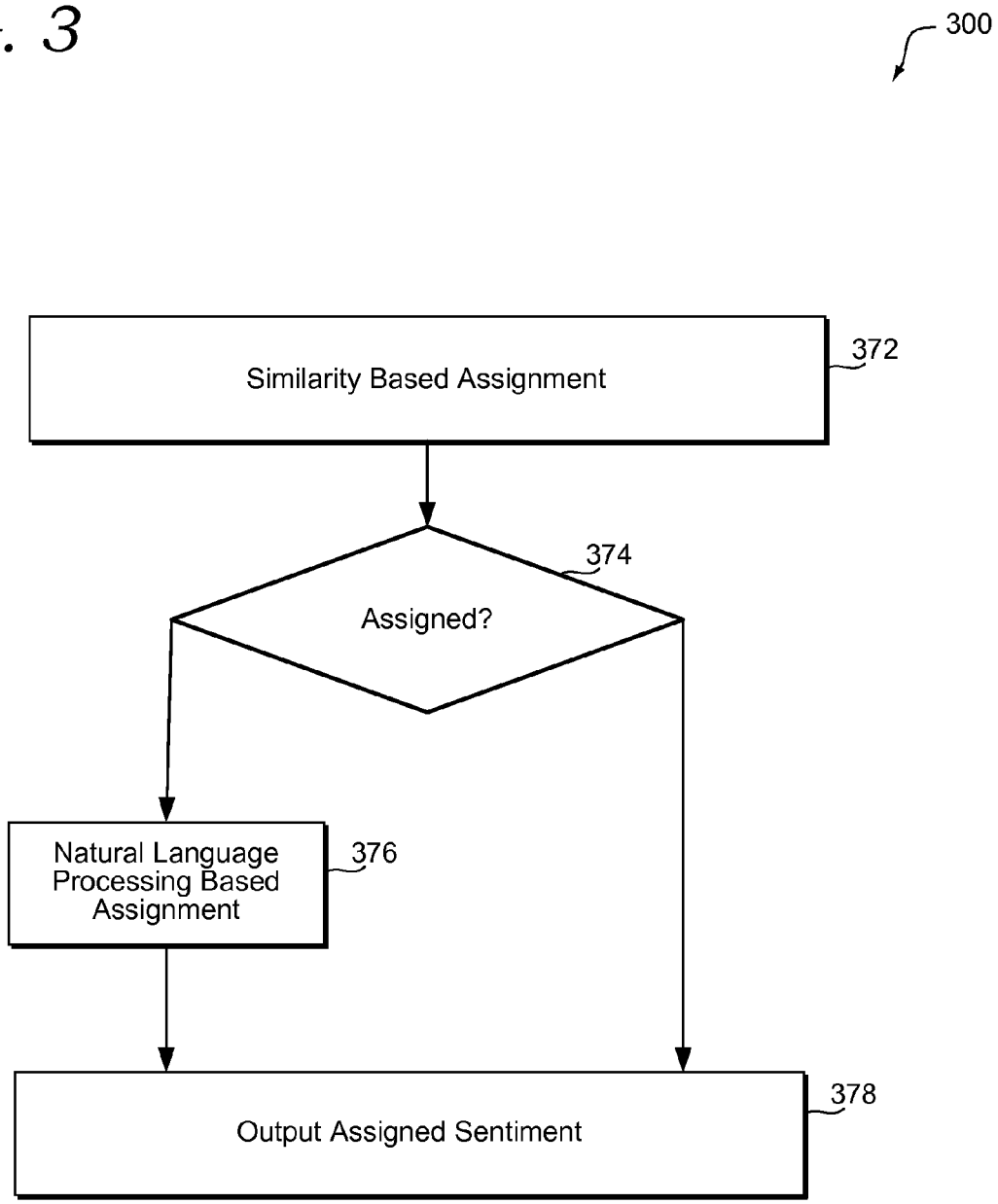
FIG. 3 is a flow diagram showing a method for assigning sentiments to social posts in accordance with implementations of the present disclosure.

Sentiment assigning component 120 applies the sentiment tuning data to new social posts to determine sentiments for the new social posts. An exemplary approach to applying the sentiment tuning data to new social posts is shown in FIG. 3. Referring now to FIG. 3 with FIG. 1, FIG. 3 is a flow diagram showing method 500 for assigning sentiments to social posts in accordance with implementations of the present disclosure.

In some implementations, applying comprises a similarity based assignment at block 372. At block 372, sentiment assigning component 120 can determine a similarity between a new social post and a reference social post of the sentiment tuning data, where the reference social post is assigned a reference sentiment in the sentiment tuning data. For example, the reference social post could be one of reference social posts 140, which is assigned one of reference sentiments 144. The reference sentiment can be applied to the new social post based on the similarity. As a specific example, the reference social post could be "go 49ers!," which is assigned a positive sentiment as a reference sentiment. The new social post could be "go 49ers go!!," which the sentiment assigning component 120 may determine is similar enough to "go 49ers!," to warrant the same assigned sentiment of a positive sentiment.

Determination of the similarity can be based on one or more similarity scores, such as similarity scores 150, shown in FIG. 1. A similarity score can be between a new social post and a reference social post. Where the similarity score exceeds a threshold level, the new social post may be considered sufficiently similar to warrant assignment of the reference sentiment assigned to the reference social post. In addition, or instead, multiple similarity scores can be generated, each between the new social post and one of the reference social posts. The new social post may be assigned the reference sentiment of the most similar reference social post, as indicated by the similarity scores.

The reference social posts that are compared to the new social post can be a subset of the total reference social posts available to social analysis tool 106. The subset can be intelligently selected so that the reference social posts in the subset are more likely to be similar to the new social post. For example, the subset may be generated based on word count and/or string length. In particular, reference social posts having similar word count and/or sting length as the new social post may be included in the subset. The reference social posts may be selected for the subset based on being within a given range of or equal to the word count and/or string count of the new social post. In some implementation, a two-level cache table is maintained for implementing the subsets, where the keys of the two-level cache table are word count and string length of the reference social posts.

The similarity scores can be generated utilizing any of various metrics for comparing the text of social posts. Some examples of the various metrics include Pearson correlation similarity, cosine similarity, and Jaccard index similarity. In implementations that assign sentiments to new social posts based on similarities to reference social posts, sentiment assigning component 120 can quickly make assignments without necessarily employing more resource intensive natural language processing. Thus, in the example shown, at decision block 374, when a social post is assigned a sentiment at block 372, the assigned sentiment can be output at block 378, for example, to analysis manager 112.

Where no reference social post is sufficiently similar to a new social post to result in an assignment of sentiment, the new social post may be subjected to natural language processing based assignment at block 376. The natural language processing can employ any of the various dictionaries described herein. For example, the user feedback based lexical dictionary, user supplied lexical dictionary 136, and/or lexical dictionary 146 can be applied to new social posts. By applying the user feedback based lexical dictionary and/or the user supplied lexical dictionary 136 to the new social posts, the sentiment tuning data can be incorporated into the natural language processing.

In some implementations, the user feedback based lexical dictionary, user supplied lexical dictionary 136, and lexical dictionary 146 are given different priorities in the natural language processing. For example, the various dictionaries can include similar designated expressive symbols in entries, but the designated sentiments between dictionaries can vary. In implementations where user supplied lexical dictionary 136 is employed, its entries can be given a highest priority. Also, entries of the user feedback based lexical dictionary can be given priority over entries of lexical dictionary 146. Lexical dictionary 146 can comprise a global or default dictionary shared between users of social analysis tool 106. Therefore, where user dictionary based entries are unavailable, the natural language processing can fall back on default designated sentiments. Assigned sentiment from block 376 can also be output at block 378, for example, to analysis manager 112.

It is noted that in various cases, only one of natural language processing based assignment and similarity based assignment are implemented. Furthermore, where both assignment approaches are implemented, decisions on which approach to execute and/or which order to execute the approaches in for assignment of sentiment to a social post can vary from method 500.

Figure 4:
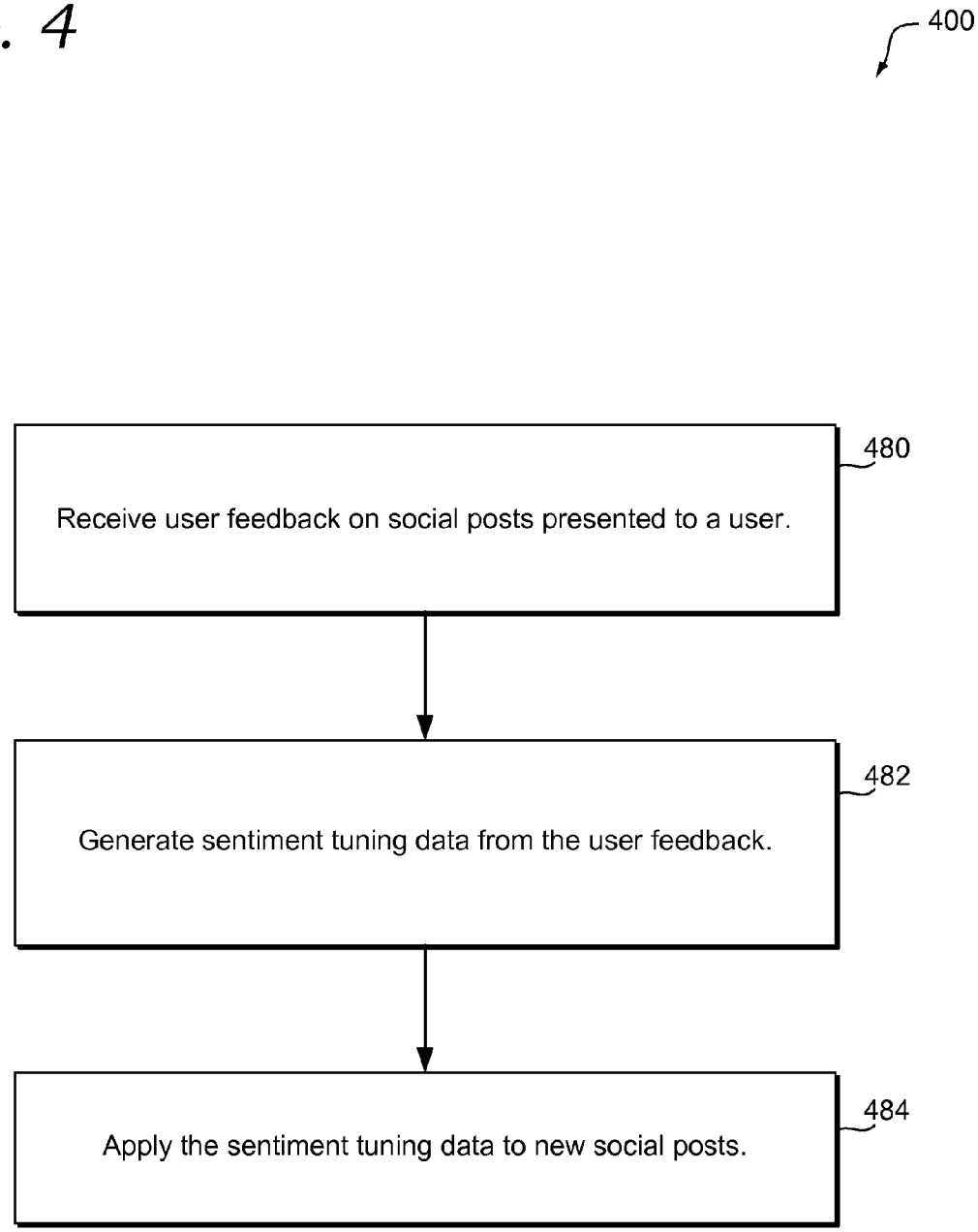
FIG. 4 is a flow diagram showing a method for assigning sentiments to social posts in accordance with implementations of the present disclosure.

Turning now to FIG. 4, a flow diagram is provided that illustrates method 400 for assigning sentiments to social posts. As shown at block 480, method 400 includes receiving user feedback on social posts presented to a user. User feedback can be received for each of one or more social posts presented to a user. The user feedback for each social post can be regarding an association between the social post and a sentiment. For example, with reference to FIG. 1, interface component 116 may present any of social posts 130*a* on a display of user device 110 to receive user feedback for each presented social post on one or more sentiments.

The sentiments optionally may have been assigned to at least one of the social posts by sentiment assigning component 120 (e.g. the sentiments could correspond to assigned sentiments 148). In a specific example, one of social posts 130*a* can include the text "I went too the super market today." Sentiment assigning component 120 may have assigned a positive sentiment as the sentiment of the social post based on expressive symbol "super" having a positive sentiment in lexical dictionary 146. The text of the social post may be presented to the user in green indicating the positive sentiment to the user.

As shown at block 482, method 400 continues with generating sentiment tuning data from the user feedback. As an example, the user feedback could indicate an association between a social post and a different sentiment than a sentiment that had been automatically assigned to the social post by sentiment assigning component 120. For example, with continued reference to FIG. 1, the user may have provided user feedback 134 utilizing UI 132, where the user feedback indicates that the user selected a different sentiment than the sentiment assigned to the social post by sentiment assigning component 120. As another example, the user may have rejected the sentiment assigned to the social post via the user feedback, which indicates a different sentiment. For example, only two sentiments may be available for the social post such that rejecting the sentiment amounts to selection of the different sentiment. In the specific example described above, the user may select a gray checkbox, where the gray checkbox and a red checkbox are presented next to the social post. User feedback 134, comprising selection of the gray checkbox, can indicate a neutral sentiment, while a user selection of the red checkbox would have indicated a negative sentiment.

Tuning data generator 114 can generate the sentiment tuning data from user feedback 134. For example, after cleaning and normalization, "I went too the super market today." can be included in reference social posts 140 as "I went to the super market today," and may be associated with (assigned to) a neutral sentiment in reference sentiments 144. It is noted that cleaning and normalization can occur prior to or after receiving user feedback and, for example, cleaned and normalized social posts could be presented for receiving the user feedback.

The generating can also comprise extracting one or more expressive symbols from the aggregated social post, and incorporating an association between the one or more expressive symbols and a designated sentiment into a lexical dictionary. For example, tuning data generator 114 may extract designated expressive symbols "super market" from the social post based on the user feedback and store the designated expressive symbols as part of designated expressive symbols 138 in association with a neutral sentiment as part of designated sentiments 142. The association may correspond to an entry in a user feedback based lexical dictionary.

Method 400 further includes applying the sentiment tuning data to new social posts in block 484. The applying can be to determine sentiments for the new social posts. As an example, the applying can comprise determining similarity scores between the new social posts and reference social posts of the sentiment tuning data, such that the assigning sentiments to the new social posts can be based on the similarity scores. Continuing with the example above, a new social post could include the text "I went to the super market today." Sentiment assigning component 120 can generate similarity scores 150 between the new social post and a subset of reference social posts 140. Based on a similarity (e.g. the similarity score) between this new social post and the reference social post, the new social post may be assigned a neutral sentiment.

As another example, the applying can comprise identifying one or more expressive symbols of the sentiment tuning data in a new social post of the new social posts, such that assigning a sentiment of the sentiments to the new social post can be based on the association in the sentiment tuning data between the one or more expressive symbols and at least one of a plurality of sentiments. For example, a new social post could include the text "I like going to the super market." Sentiment assigning component 120 can generate similarity scores 150 between the new social post and a subset of reference social posts 140. None of similarity scores 150 may be high enough to assign an associated reference sentiment, based on similarity scores 150. In other words, sentiment assigning component 120 determines that the new social post is dissimilar to the subset of reference social posts 140. In response, sentiment assigning component 120 can instead turn to natural language processing to assign a sentiment to the new social post.

In doing so, sentiment assigning component 120 identifies expressive symbols "like" and "super market" in the new social post. In the present example, "like" does not have an entry in a user feedback based lexical dictionary or user supplied lexical dictionary 136 (i.e., it is not included in designated expressive symbols 138). However, "like" does have at least one entry in lexical dictionary 146 with a positive sentiment, which is utilized in assigning a sentiment to the new social post. Furthermore, "super market" has an entry in the user feedback based dictionary with a neutral sentiment (i.e. is included in designated expressive symbols 138), which is utilized in assigning the sentiment to the new social post. Based on the positive sentiment and the neutral sentiment, a positive sentiment is assigned to the new social post.

In the above example, while a positive sentiment would have been assigned to the new social post without user feedback 134, user feedback 134 has changed the degree of the sentiment. In particular, without user feedback 134 the identified expressive symbols in the new social post would both have positive sentiment ("like" and "super"). However, with user feedback 134, only "like" has positive sentiment. Whereas without user feedback 134, the new social post could have a degree of correlation of 8, the new social post instead has a degree of correlation of 6, as a specific example. Thus, the assigning of the sentiment has increased accuracy based on user feedback.

Figure 5:
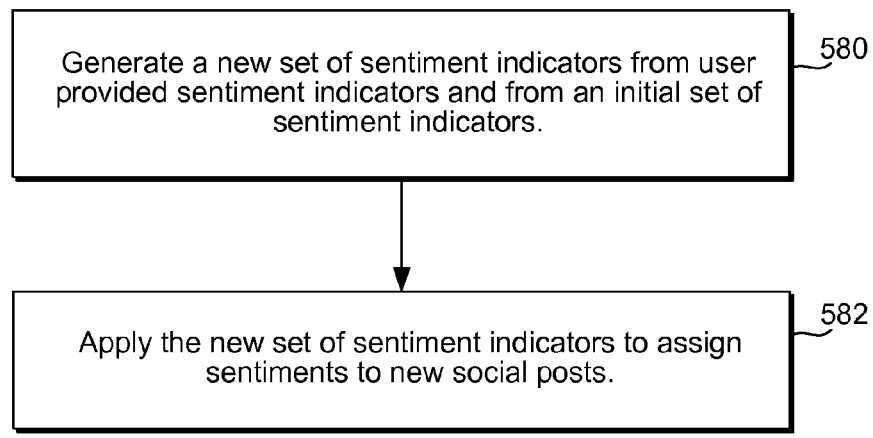
FIG. 5 is a flow diagram showing a method for assigning sentiments to social posts in accordance with implementations of the present disclosure.

Referring now to FIG. 5, a flow diagram is provided that illustrates method 500 for assigning sentiments to social posts. Method 500 includes generating a new set of sentiment indicators from user provided sentiment indicators and from an initial set of sentiment indicators at block 580.

In some implementations, the initial set of sentiment indicators could have been previously used to assign sentiments to social posts. For example, social posts could have been analyzed to assign sentiments to the social posts using the initial set of sentiment indicators prior to block 580. As an example, sentiment assigning component 120 can analyze a social post that includes the text "#Gossip #Madonna Madonna performs in St. Louis Thursday night." The social post has been collected by analysis manager 112 from social network 102b, which is TWITTER in the present example. The initial set of sentiment indicators can comprise, at least, the entries in lexical dictionary 146. In analyzing the social post, sentiment assigning component 482 can look up one or more expressive symbols, such as "#Gossip" in lexical dictionary 146. "#Gossip" is assigned a negative sentiment in lexical dictionary 146, which results in the social post being assigned a negative sentiment.

The user provided sentiment indicators can comprise assignments between reference sentiments and reference social posts. In some implementations, the new set of sentiment indicators correspond to user feedback 134. User feedback 134 can include numerous social posts, as well as sentiments that the user has assigned to the social posts, for example using UI 132. In some instances, one of those posts corresponds to the social post "#Gossip #Madonna Madonna performs in St. Louis Thursday night," which was displayed to the user to solicit the user feedback. In this example, the sentiment of negative sentiment was not displayed to the user. However, the user had selected neutral sentiment from a drop down menu that displayed positive sentiment, negative sentiment, and neutral sentiment as selectable options. This selection is reflected in user feedback 134. The selection could be based on the user being in the news domain, where "#Gossip" does not indicate a negative sentiment, but could correspond to a neutral sentiment for providing newsworthy information.

The new set of sentiment indicators can correspond to the previous or initial set of sentiment indicators, with the addition of new assignments between reference social posts in reference social posts 140 and reference sentiments in reference sentiments 144 and/or new entries in a user feedback based dictionary comprising new or altered assignments between designated expressive symbols 138 and designated sentiments 142. The new set of sentiment indicators can update the initial set of sentiment indicators with a designated expressive symbol "#Gossip" assigning to a designated sentiment of neutral sentiment. The new set of sentiment indicators can further update the initial set of sentiment indicators with a reference social post of "#Gossip Madonna performs in St. Louis Thursday night" and an assigned reference sentiment of neutral sentiment.

Method 500 additionally includes applying the new set of sentiment indicators to assign sentiments to new social posts at block 582. For example, sentiments of the new social posts can be determined by applying the new set of sentiment indicators to an analysis of the new social posts. In doing so, sentiment assigning component 120 may analyze social posts 130b using the sentiment indicators generated by tuning data generator 114. Therefore, a new social post that includes the text "#Gossip #Cher Cher performs in LA tonight," can be assigned a neutral sentiment by applying the new set of sentiment indicators, where the old set of sentiment indicators would have resulted in assignment of a negative sentiment. Furthermore, for a different user, this new social post could still be assigned a negative sentiment, or even a positive sentiment, as the changes in the new set of sentiment indicators are user specific in the present example.

Figure 6:
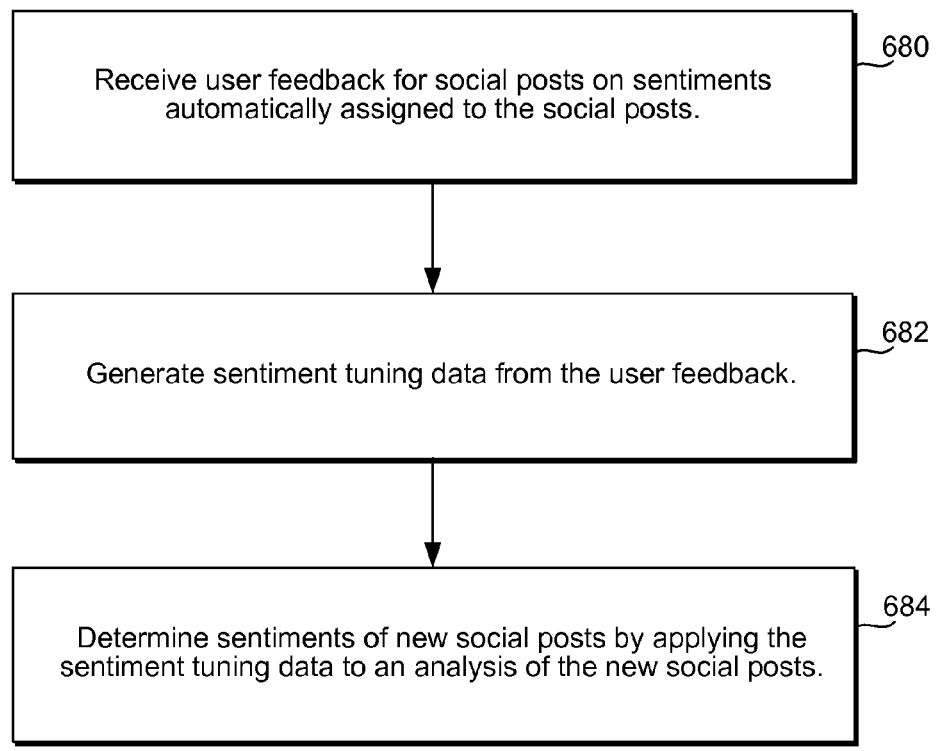
FIG. 6 is a flow diagram showing a method for assigning sentiments to social posts in accordance with implementations of the present disclosure.

With reference to FIG. 6, a flow diagram is provided that illustrates method 600 for assigning sentiments to social posts. As shown in FIG. 6, method 600 includes receiving user feedback from social posts on sentiments automatically assigned to the social posts at block 682. The user feedback can be for each social post of a plurality of social posts on sentiments automatically assigned to each of the social posts. Furthermore, the user feedback may be received in response to presenting the social posts and/or the sentiments to a user. For example, each of social posts 130a can be presented to the user on a display of user device 110. The user may select from positive, negative, or neutral sentiments for social posts 130a. Alternatively, the user may select numbers corresponding to degrees of sentiments (e.g. a number from 1 to 10).

Furthermore, the sentiments may have been automatically assigned to the social posts by analyzing the social posts to assign the sentiments. For example, social posts 130a can be analyzed by sentiment assigning component 120 to assign sentiments to social posts 130a. In one implementation, sentiment assigning component 120 selected its assignment from positive, negative, or neutral sentiments for the poster of a social post. The positive, negative, or neutral sentiments can be represented as degrees of sentiments ranging from 1 to 10 with 1-4 corresponding to negative, 5 corresponding to neutral, and 6-10 corresponding to positive, for each social post.

Method 600 also includes generating sentiment tuning data from the user feedback at block 684. The sentiment tuning data can comprise assignments between reference sentiments and reference social posts. In the present example, the sentiment tuning data can be generated from the selections made by the user in the user feedback. Where the user had selected positive, negative, or neutral sentiments, the degrees of sentiments may be updated by tuning data generator 114 to fall within a corresponding range as the selected sentiment. As one example, a degree of 5 corresponding to an assigned sentiment of neutral sentiment could be updated to a degree of 7 correspond to an updated sentiment of positive sentiment. Where the user selected the number, the degree could be updated to that number or otherwise be updated based on that number.

At block 686, method 600 includes determining sentiments of new social posts by applying the sentiment tuning data to an analysis of the new social posts. For example, sentiment assigning component 120 can assign sentiments to social posts 130*b* using the updated degrees of sentiments in natural language processing, and/or can use the updated degrees of sentiments as assigned sentiments based on the aforementioned similarity comparisons with reference social posts.

Figure 7:
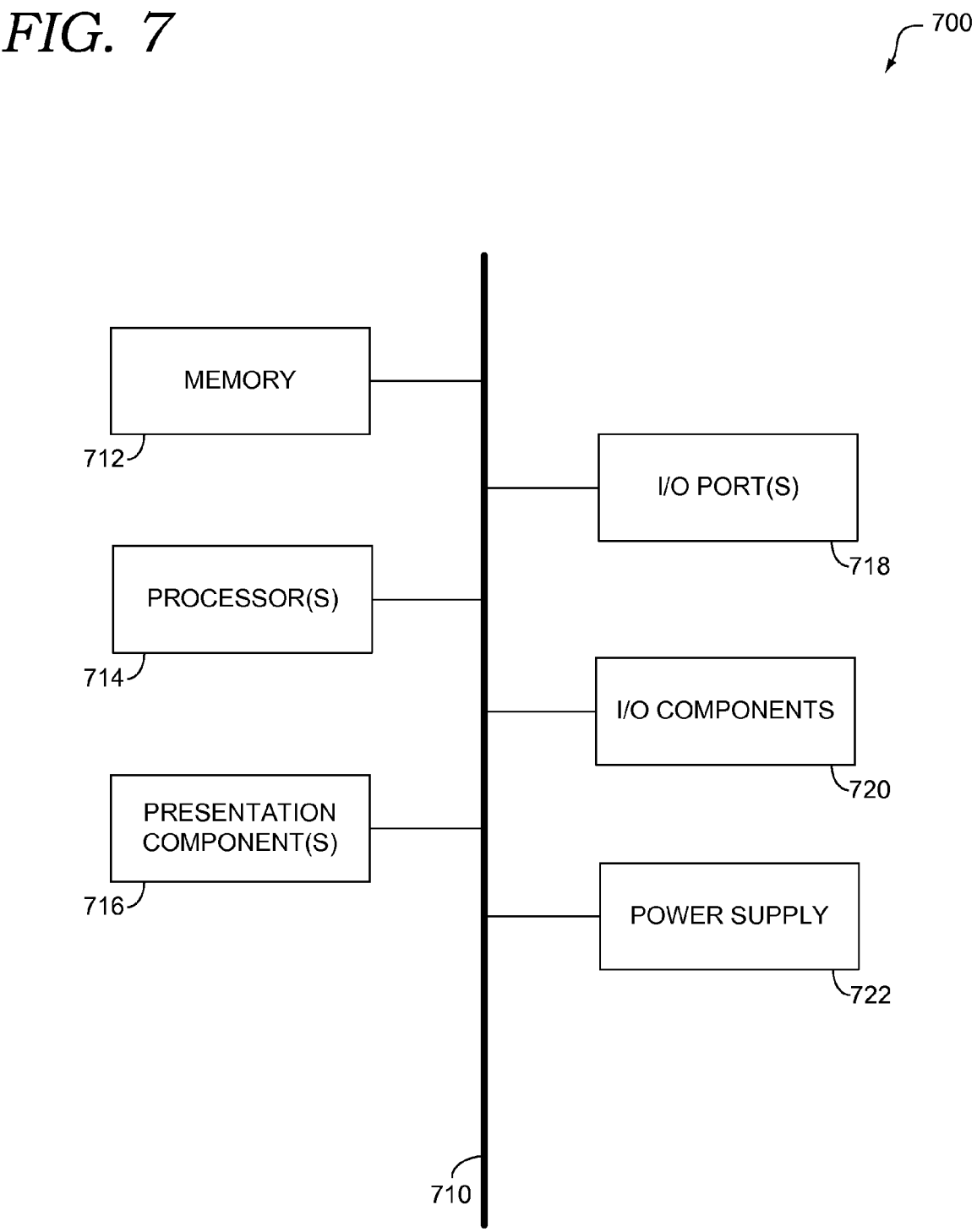
FIG. 7 is a block diagram of an exemplary computing environment suitable for use in implementations of the present disclosure.

Having described implementations of the present disclosure, an exemplary operating environment in which embodiments of the present invention may be implemented is described below in order to provide a general context for various aspects of the present disclosure. Referring initially to FIG. 7 in particular, an exemplary operating environment for implementing embodiments of the present invention is shown and designated generally as computing device 700. Computing device 700 is but one example of a suitable computing environment and is not intended to suggest any limitation as to the scope of use or functionality of the invention. Neither should the computing device 700 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 7, computing device 700 includes bus 710 that directly or indirectly couples the following devices: memory 712, one or more processors 714, one or more presentation components 716, input/output (I/O) ports 718, input/output components 720, and illustrative power supply 722. Bus 710 represents what may be one or more busses (such as an address bus, data bus, or combination thereof). Although the various blocks of FIG. 7 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 7 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 7 and reference to "computing device."

Computing device 700 typically includes a variety of computer-readable media. Computer-readable media can be any available media that can be accessed by computing device 700 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 700. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 712 includes computer-storage media in the form of volatile and/or nonvolatile memory. The memory may be removable, non-removable, or a combination thereof. Exemplary hardware devices include solid-state memory, hard drives, optical-disc drives, etc. Computing device 700 includes one or more processors that read data from various entities such as memory 712 or I/O components 720. Presentation component(s) 716 present data indications to a user or other device. Exemplary presentation components include a display device, speaker, printing component, vibrating component, etc.

I/O ports 718 allow computing device 700 to be logically coupled to other devices including I/O components 720, some of which may be built in. Illustrative components include a microphone, joystick, game pad, satellite dish, scanner, printer, wireless device, etc. The I/O components 720 may provide a natural user interface (NUI) that processes air gestures, voice, or other physiological inputs generated by a user. In some instance, inputs may be transmitted to an appropriate network element for further processing. A NUI may implement any combination of speech recognition, touch and stylus recognition, facial recognition, biometric recognition, gesture recognition both on screen and adjacent to the screen, air gestures, head and eye tracking, and touch recognition associated with displays on the computing device 700. The computing device 700 may be equipped with depth cameras, such as, stereoscopic camera systems, infrared camera systems, RGB camera systems, and combinations of these for gesture detection and recognition. Additionally, the computing device 700 may be equipped with accelerometers or gyroscopes that enable detection of motion. The output of the accelerometers or gyroscopes may be provided to the display of the computing device 700 to render immersive augmented reality or virtual reality.

As can be understood, implementations of the present disclosure provide for assignments between social posts and sentiments based on user feedback. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. One or more computer storage media storing computer-useable instructions that, when used by one or more computing devices, cause the one or more computing devices to perform operations comprising:
   receiving user feedback for each of one or more social posts presented to a user, each social post presented in association with a sentiment assigned to the social post, the user feedback for each social post regarding the sentiment assigned to the social post;
   generating sentiment tuning data from the user feedback;
   generating a new set of sentiment indicators from user provided sentiment indicators of the sentiment tuning data;
   applying the new set of sentiment indicators, generated from the sentiment tuning data, to new social posts to determine sentiments for the new social posts, wherein the applying comprises:
      identifying designated expressive symbols of the new set of sentiment indicators in the new social posts, the new set of sentiment indicators comprising assignments between the designated expressive symbols and designated sentiments; and
      determining assignments of the sentiments to the new social posts based on the assignments between the designated expressive symbols and the designated sentiments; and
   presenting the new social posts in association with the sentiments assigned to the new social posts.

2. The one or more computer storage media of claim 1, wherein the applying further comprises:
   determining a similarity between a new social post of the new social posts and a reference social post of the sentiment tuning data, the reference social post being assigned a reference sentiment in the sentiment tuning data;
   assigning a sentiment to the new social post based on the similarity.

3. The one or more computer storage media of claim 1, wherein the applying further comprises:
   determining similarity scores between the new social posts and reference social posts of the sentiment tuning data;
   assigning the sentiments to the new social posts based on the similarity scores.

4. The one or more computer storage media of claim 1, wherein the user provided sentiment indicators comprise assignments between reference sentiments and reference social posts.

5. The one or more computer storage media of claim 1, wherein the identifying and the determining of the assignments are performed in response to determining that the new social posts are dissimilar to a plurality of reference social posts of the sentiment tuning data.

6. The one or more computer storage media of claim 1, wherein the sentiments correspond to at least one of positive sentiment, negative sentiment, and neutral sentiment.

7. The one or more computer storage media of claim 1, wherein the social posts are from a plurality of social networks.

8. The one or more computer storage media of claim 1, wherein the user feedback comprises a user selection of a different sentiment than the sentiment for at least one of the social posts.

9. The one or more computer storage media of claim 1, wherein the presenting comprises indicating the association between the social post and the sentiment on a display.

10. The one or more computer storage media of claim 1, wherein:
    the generating of the sentiment tuning data comprises:
       extracting one or more designated expressive symbols from the one or more social posts; and
       incorporating an association between the one or more designated expressive symbols and a designated sentiment into a lexical dictionary;
    wherein the applying the new set of sentiment indicators utilizes the lexical dictionary to determine the sentiments.

11. A computer implemented method comprising:
    receiving user feedback for each of one or more social posts presented to a user, each social post presented in association with a sentiment assigned to the social post, the user feedback for each social post regarding the sentiment assigned to the social post;
    generating sentiment tuning data from the user feedback;
    generating a new set of sentiment indicators from user provided sentiment indicators of the sentiment tuning data;
    applying the new set of sentiment indicators, generated from the sentiment tuning data, to new social posts to determine sentiments for the new social posts, wherein the applying comprises:
       identifying designated expressive symbols of the new set of sentiment indicators in the new social posts, the new set of sentiment indicators comprising assignments between the designated expressive symbols and designated sentiments; and
       determining assignments of the sentiments to the new social posts based on the assignments between the designated expressive symbols and the designated sentiments; and
    presenting the new social posts in association with the sentiments assigned to the new social posts.

12. The computer implemented method claim 11, wherein the new set of sentiment indicators comprises associations between designated sentiments and designated expressive symbols extracted from reference social posts provided by the user feedback.

13. The computer implemented method claim 11, wherein the new set of sentiment indicators comprises assignments between reference sentiments and reference social posts.

14. The computer implemented method claim 11, wherein the user provided sentiment indicators are from the user feedback.

15. The one or more computer storage media of claim 11, wherein wherein a first sentiment of the sentiments comprises a positive sentiment, a second sentiment of the sentiments comprises a negative sentiment, and a third sentiment of the sentiments comprises a neutral sentiment.

16. A computerized system comprising:
    one or more processors; and
    one or more computer storage media storing computer-useable instructions that, when used by the one or more processors, cause the one or more processors to:
       receive user feedback for each of one or more social posts presented to a user, each social post presented in association with a sentiment assigned to the social post, the user feedback for each social post regarding the sentiment assigned to the social post;
generate sentiment tuning data from the user feedback;
generate a new set of sentiment indicators from user provided sentiment indicators of the sentiment tuning data;
apply the new set of sentiment indicators, generated from the sentiment tuning data, to new social posts to determine sentiments for the new social posts, wherein the applying comprises:
  identify designated expressive symbols of the new set of sentiment indicators in the new social posts, the new set of sentiment indicators comprising assignments between the designated expressive symbols and designated sentiments; and
  determine assignments of the sentiments to the new social posts based on the assignments between the designated expressive symbols and the designated sentiments; and present the new social posts in association with the sentiments assigned to the new social posts.

17. The computerized system of claim 16, wherein the user feedback contradicts at least one of the sentiments assigned to at least one of the one or more social posts.

18. The computerized system of claim 16, wherein the sentiments comprise degrees of sentiments.

19. The computerized system of claim 16, wherein the sentiment tuning data is further generated from a user supplied lexical dictionary comprising associations between designated expressive symbols and designated sentiments of a plurality of sentiments.

20. The computerized system of claim 16, wherein a first sentiment of the sentiments comprises a positive sentiment, a second sentiment of the sentiments comprises a negative sentiment, and a third sentiment of the sentiments comprises a neutral sentiment.

* * * * *